Sept. 5, 1933.                F. W. EDWARDS                1,925,796
                    LUBRICATING APPARATUS AND ASSEMBLY
                  Filed Nov. 26, 1930            2 Sheets-Sheet 1
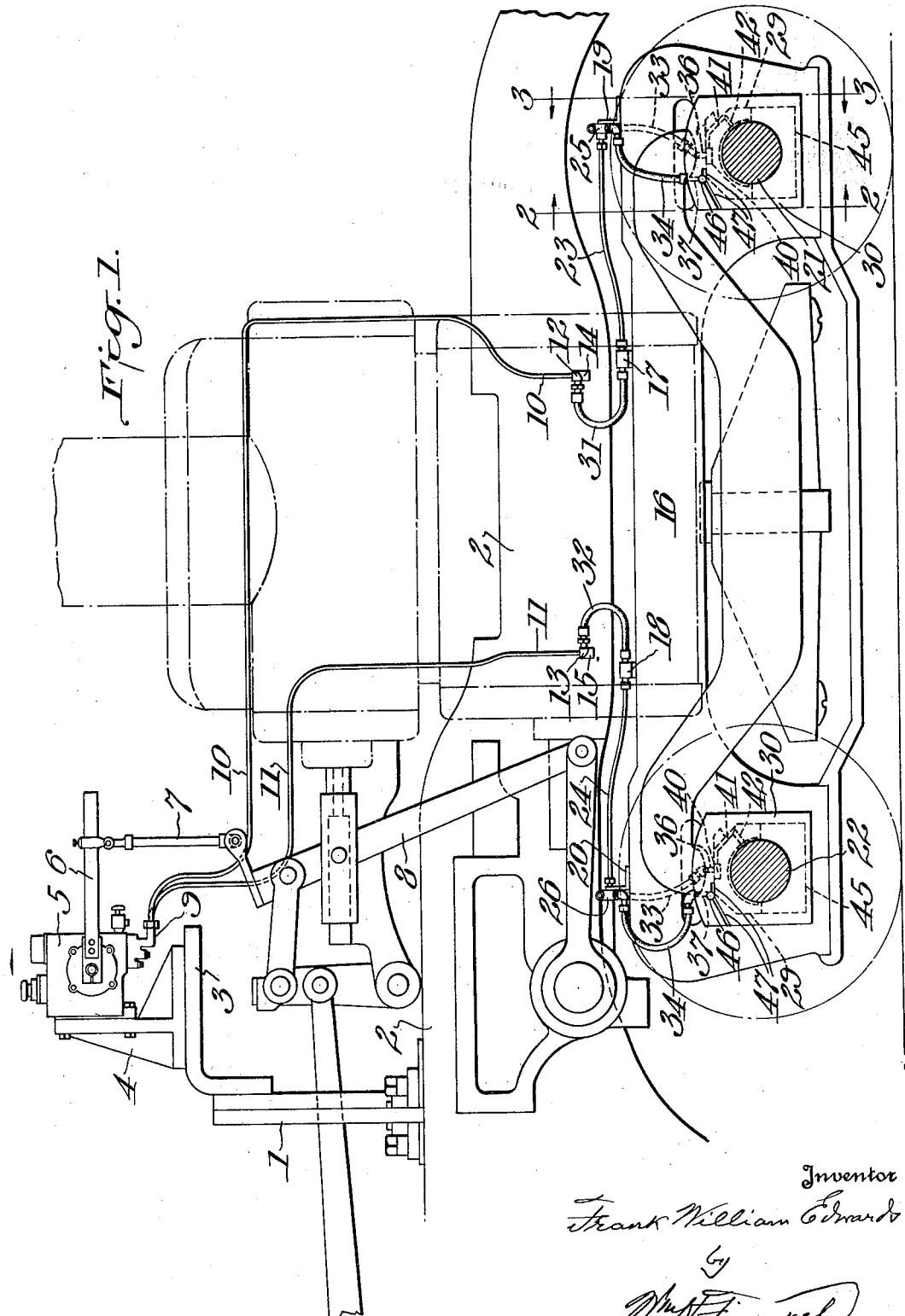

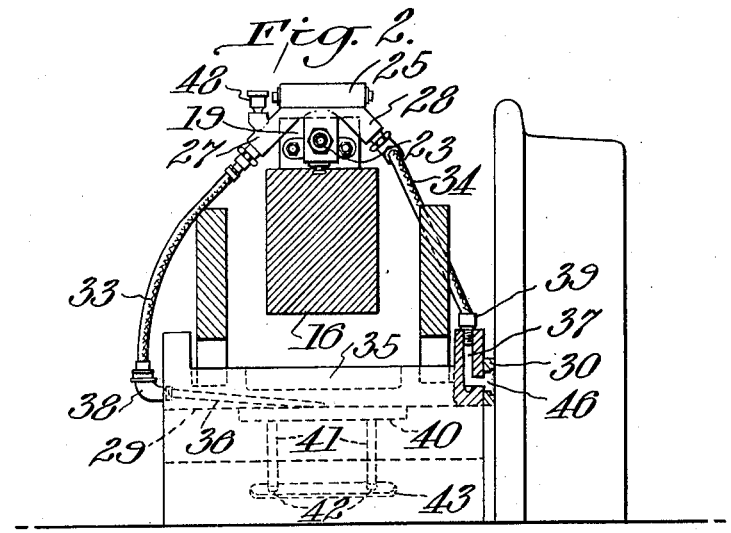
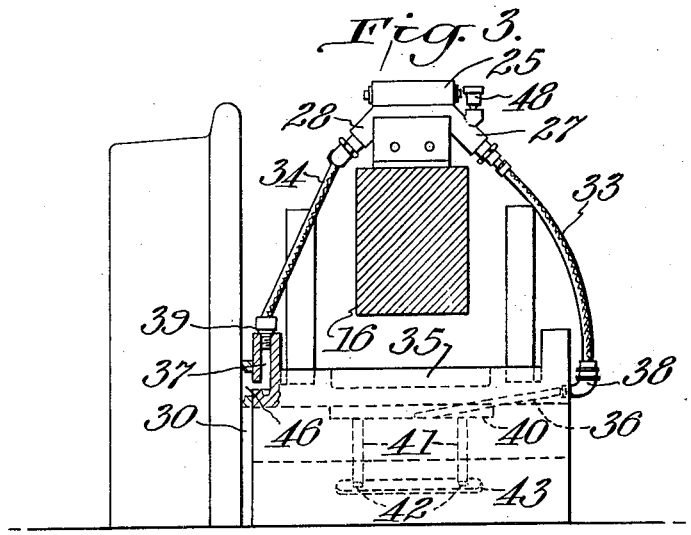
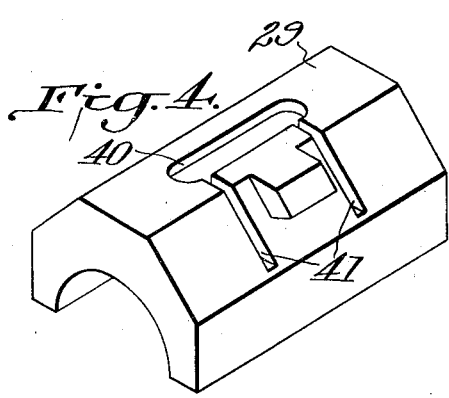
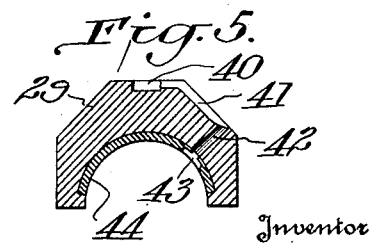

Patented Sept. 5, 1933

1,925,796

UNITED STATES PATENT OFFICE 1,925,796

LUBRICATING APPARATUS AND ASSEMBLY

Frank William Edwards, Chicago, Ill., assignor to The Ohio Injector Company of Illinois, Chicago, Ill., a corporation of Illinois Application November 26, 1930
Serial No. 498,446

4 Claims. (Cl. 184—7)

This invention relates to lubricating apparatus, and an assembly of same adapted primarily for the lubrication of the axle brasses and hub liners of the front trucks of locomotives.

The object of the invention is to arrange the various parts of the apparatus comprising the assembly of same, whereby lubricant is fed from a lubricator to the brasses and hub liners, so as to dispense to the greatest extent possible with flexible connections.

In assemblies of lubricating apparatus for supplying lubricant to the axle brasses and hub liners of locomotives, where the lubricator proper is mounted upon the frame of the locomotive, provision must be made for relative movement between parts, such as between the truck frame and the locomotive frame, and between the axles, axle brasses and hub liners and the truck frame. This relative movement is accommodated, in accordance with my invention, by the interposition of flexible connections. These connections are so arranged with respect to the relatively moving parts that they may be made as short as possible consistent with the serving of their purpose, and so that they may be subjected to relatively slight flexure upon relative movement of the parts, and their likelihood of failure in service thus lessened.

Although the invention is shown in the drawings and will be hereinafter described particularly with reference to its embodiment in connection with the front truck of a locomotive, it will be understood that it is susceptible of application with similar advantageous results to other pivotally mounted trucks.

The invention consists in a lubricating apparatus and assembly, including a lubricator, preferably of the force-feed type, rigidly mounted upon the frame of a railway vehicle, particularly the frame of a locomotive and having connected with its feeds relatively rigid pipes or conduits extending into close proximity to the locomotive front truck and rigidly connected to the frame of the locomotive to furnish a plurality of more or less permanent lubricant-conducting channels from the lubricator to points adjacent to the truck. Relatively rigid pipes or conduits are also mounted on the truck frame and extend from points adjacent to the points of termination of the conduits from the lubricator to points substantially overlying the truck axles, at which latter points they are preferably connected with manifolds whereby the lubricant fed through them may be divided and fed to the axle brasses and hub liners, respectively, of the wheels of the truck, flexible connections being interposed between the conduits carried by the locomotive frame and by the truck frame, respectively, and between the manifolds and the axle brasses and hub liners, all as will be hereinafter explained more fully and finally claimed.

In the accompanying drawings illustrating the invention, in the several figures of which like parts are similarly designated, Figure 1 is a schematic sectional side elevation of sufficient of the front end of a locomotive to illustrate the assembly of the apparatus of the invention. Fig. 2 is a fragmentary sectional elevation taken substantially on the line 2—2 of Fig. 1 and looking in the direction of the arrows, with certain parts broken away. Fig. 3 is a fragmentary sectional elevation taken substantially on the line 3—3 of Fig. 1, looking in the direction of the arrows, with certain parts broken away. Fig. 4 is a perspective view of an axle brass suitable for use in connection with the assembly, and Fig. 5 is a transverse section thereof.

Referring to Fig. 1, it will be seen that upon the guide member 1 of the locomotive side frame member 2 is fixed a bracket 3 to which is attached a stand 4, and to this stand 4 is bolted or otherwise secured a mechanical force-feed lubricator 5 of any approved type, such for example as that illustrated in the copending applications of Frank W. Edwards and Fordyce B. Farnsworth, Serial No. 304,862, filed September 10, 1928, now Patent No. 1,886,659, dated Nov. 8, 1932, and Serial No. 475,528, filed August 15, 1930, now Patent No. 1,881,353, dated Oct. 4, 1932. This lubricator is provided with lubricant forcing mechanism including an arm 6 connected by means of a rod 7 with a member 8 of the link motion of the locomotive, so that while the locomotive is moving whether under power or drifting, the arm 6 will be oscillated and the lubricant forcing mechanism of the lubricator 5 will be operated to force lubricant into the plurality of feeds, one of which is indicated at 9.

In an ordinary installation for lubricating the axle brasses and hub liners of a locomotive front truck, four of the feeds 9 of the lubricator are utilized, two of which are arranged to supply lubricant to the brasses and hub liners at one side of the truck, and the other two of which are utilized to supply lubricant to the brasses and hub liners at the other side of the truck. In Fig. 1 the installation assembly for one side only of the truck is shown. This comprises two relatively rigid pipes or conduits 10 and 11 which extend from two of the feeds 9 of the lubricator to points on the locomotive side frame member 2 adjacent to the truck, where they are connected with elbows 12 and 13 respectively attached to brackets 14 and 15 suitably secured, as by welding, to the frame member 2. To the side frame member 16 of the truck are applied brackets 17 and 18 which normally substantially underlie, in vertical alignment, the elbows 12 and 13, and brackets 19 and 20 which substantially overlie the front and rear axles 21 and 22 of the truck. Between the brackets 17, 19 and 18, 20, respectively, are arranged relatively rigid pipes or conduits 23 and 24 similar to the conduits 10 and 11, and to the brackets 19 and 20 are fixed manifolds 25 and 26, respectively, (see Figs. 2 and 3). Each of these manifolds has two branches 27 and 28, one of which, 27, is adapted to supply lubricant to the axle brass 29 underlying it, and the other of which, 28, is adapted to supply lubricant to the hub liner 30 underlying it.

Connection is made between the elbow 12 and conduit 23, and between the elbow 13 and conduit 24 by short sections of flexible tubing 31 and 32, such as armored hose. As will be seen by reference to Fig. 1, the elbows 12 and 13 and the brackets 17 and 18 are located in such proximity to the vertical turning axis of the front truck that very little lateral movement is caused between them when the truck turns upon its axis as the locomotive travels on curves, and therefore short sections only of the flexible tubing are necessary to accommodate this relative movement. Moreover, by thus providing for merely a slight relative movement between the points of connection of the sections of flexible tubing, very little wear and strain will be put upon the tubing and very little slack is necessary. Thus, deterioration of the sections of tubing is practically negligible and the service life of the same is relatively long.

In view of the fact, as hereinbefore pointed out, that there is relative movement between the axles, axle brasses and hub liners of the truck and the truck frame, it is necessary to connect the branches of the manifolds 25 and 26 with the points of delivery of lubricant to the brasses and hub liners by means of flexible connectors 33 and 34 respectively. Inasmuch as the manifolds 25 and 26 substantially overlie the axles 21 and 22, very little movement need be provided for, and hence the sections of flexible tubing 33 and 34 may be relatively short, with the attendant advantages just above mentioned with respect to the flexible members 31 and 32.

The axle housings 35 to which the brasses 29 and hub liners 30 are applied are drilled, as indicated at 36 and 37, to supply lubricant to the brasses and hub liners, and to the bores thus formed are applied fittings 38 and 39 respectively to which the flexible tubes 33 and 34 are connected.

Each of the axle brasses 29 is provided in its top with a pocket or chamber 40 from which, and extending over the shelving sides of the brass, lead grooves or channels 41 connected at their lower ends by bores 42 with the ends of a longitudinally or axially extending lubricant pocket 43 formed in the antifriction liner 44 of the brass. The bore 36 of the housing communicates with the recess or chamber 40 and supplies lubricant thereto from the tube 33, and the lubricant thus supplied flows by gravity into the pocket 43 at both ends and is thus brought in lubricating contact with the axle. Surplus lubricant which is carried around by the axle is deposited in the usual packing of waste held by the container 45.

Each of the hub liners 30 is provided with a recess or chamber 46 which communicates with the bore 37, and from this chamber 46 extend facial grooves 47 which receive lubricant from the chamber 46 and apply it to the wheel hub which is in wiping contact with the face of the hub liner.

For purposes of supplying lubricant in excess of that normally furnished by the force-feed lubricator to the axle brasses, the branch 27 of each of the manifolds is provided with an oil cup 48 through which additional lubricant may be fed to the brasses when required by means of a hand oiler or the like.

By the use of the installation of the invention, it will be seen that the major portion of the lubricant conduits employed is of relatively rigid, permanent pipe or tubing, such as copper, brass or steel tubing, and that only such lengths of flexible tubing are used as may be actually necessary to accommodate normal relative movement between parts. Thus the installation is made substantially permanent and the likelihood of breakage and failure in service reduced to a minimum.

Various changes and modifications are deemed to be within the spirit of the invention and the scope of the following claims.

What I claim is:—

1. In a lubricating apparatus, the combination with a locomotive frame and the frame of a pivoted truck of the locomotive, of means for supplying lubricant to the axle bearings of said truck, including a lubricator carried by the locomotive frame, a relatively rigid conduit leading from said lubricator into proximity to said truck frame and fixed to said locomotive frame adjacent to the pivotal axis of the truck, a relatively rigid conduit carried by said truck frame and provided with a flexible connection leading to an axle bearing, and flexible conduit means connecting said relatively rigid conduits, whereby relative movement between said locomotive frame and said truck frame and between said bearing and truck frame may be accommodated.

2. In a lubricating apparatus, the combination with a locomotive frame and the frame of a pivoted truck of the locomotive, of means for supplying lubricant to the axle bearings of said truck including a lubricator carried by the locomotive frame, a relatively rigid conduit leading from said lubricator into proximity to said truck frame and fixed to said locomotive frame adjacent to the pivotal axis of the truck, a relatively rigid conduit fixed to said truck frame and extending into proximity to an axle bearing including an axle brass and a hub liner, a manifold connected with the last mentioned relatively rigid conduit, flexible connections between said axle brass and hub liner and said manifold, and a flexible connection between said relatively rigid conduits.

3. In a lubricating apparatus, the combination with a locomotive frame and the frame of a pivoted truck of the locomotive, of means for supplying lubricant to the axle bearings of said truck, including a lubricator carried by the locomotive frame, a relatively rigid conduit leading from said lubricator into proximity to said truck frame and fixed to said locomotive frame adjacent to the pivotal axis of the truck, a conduit fixed to said truck frame and having one end adjacent to a bearing and its other end adjacent to the end of the first-mentioned conduit, and a flexible connection between the adjacent ends of said conduits, the arrangement of the ends of said conduits relatively to the pivotal axis of said truck making practical a short flexible connection.

4. In a lubricating apparatus, the combination with a locomotive frame and the frame of a pivoted truck of the locomotive, of means for supplying lubricant to the axle bearings of said truck, including a lubricator carried by the locomotive frame and provided with a plurality of feeds, a plurality of relatively rigid conduits connected with said feeds and fixedly connected with said locomotive frame adjacent to the pivotal axis of the truck and terminating adjacent to the truck frame, a plurality of relatively rigid conduits fixedly carried by said truck frame, flexible connections between the relatively rigid conduits carried by the truck frame and the truck axle bearings, and flexible connections between the relatively rigid conduits carried by the locomotive frame and those carried by the truck frame, whereby movement between the axle bearings and truck frame and between the truck frame and locomotive frame, respectively, may be accommodated.

FRANK WILLIAM EDWARDS.